United States Patent
Callahan et al.

(10) Patent No.: US 7,207,523 B2
(45) Date of Patent: Apr. 24, 2007

(54) SEAT POWER BUS WITH DISCRETE CONNECTION PORTS

(75) Inventors: Kevin S Callahan, Shoreline, WA (US); Trevor M Laib, Woodinville, WA (US); Bradley J Mitchell, Snohomish, WA (US); James T Henley, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/936,004

(22) Filed: Sep. 8, 2004

(65) Prior Publication Data

US 2006/0049311 A1 Mar. 9, 2006

(51) Int. Cl.
*B64D 11/06* (2006.01)
(52) U.S. Cl. .................. 244/118.6; 439/210; 174/10
(58) Field of Classification Search ............ 244/129.1, 244/118.1, 118.5, 118.6, 122 R; 439/157, 439/131, 210, 110; 296/65.13; 361/601; 174/10, 70 R, 209, 74 R, 15.7; 297/344.1, 297/217.4
See application file for complete search history.

(56) References Cited

U.S. PATENT DOCUMENTS

| | | | |
|---|---|---|---|
| 4,428,078 A | | 1/1984 | Kuo |
| 4,763,360 A | | 8/1988 | Daniels et al. |
| 4,774,514 A | * | 9/1988 | Hildebrandt et al. ........ 340/971 |
| 4,853,555 A | * | 8/1989 | Wheat ........................ 307/9.1 |
| 4,875,871 A | * | 10/1989 | Booty et al. ................ 439/209 |
| 4,936,527 A | * | 6/1990 | Gorges ..................... 244/118.6 |
| 5,279,506 A | * | 1/1994 | Kawase et al. ............. 439/157 |
| 6,267,430 B1 | * | 7/2001 | Cresseaux ................ 296/65.13 |
| 6,341,968 B1 | * | 1/2002 | Grant ......................... 439/157 |
| 6,375,481 B2 | * | 4/2002 | Zweigle ...................... 439/157 |
| 6,492,594 B1 | * | 12/2002 | Magyar et al. ............... 174/97 |
| 6,527,566 B1 | * | 3/2003 | Lambiaso ................... 439/131 |
| 6,601,798 B2 | * | 8/2003 | Cawley ................... 244/118.6 |
| 6,619,588 B2 | * | 9/2003 | Lambiaso ................. 244/118.5 |
| 2002/0144835 A1 | * | 10/2002 | Samhammer ............. 174/72 A |
| 2004/0017648 A1 | * | 1/2004 | Tsubaki ..................... 361/601 |
| 2004/0129445 A1 | * | 7/2004 | Winkelbach et al. ......... 174/76 |
| 2004/0159764 A1 | * | 8/2004 | Oshima et al. ............. 248/429 |

* cited by examiner

*Primary Examiner*—Galen Barefoot
(74) *Attorney, Agent, or Firm*—Harness, Dickey & Pierce, P.L.C.

(57) ABSTRACT

A power/data bus for conducting at least one of data and power signals to a variety of different locations on a mobile platform. The bus has a plurality of discrete connection ports, and at least one conductive cable. The power/data bus extends across an area where access to at least one of data and electricity is desired. The discrete connection ports are spaced apart at different locations along the power/data bus. The conductive cable extends through the power/data bus and is connected to at least one of the discrete connection ports. The conductive cable conducts at least one of power and data signals between the discrete connection ports and a data/power source. At least one of the connection ports are operable to cooperate with a connector of an external device to supply at least one of power and data signals to the external device. The power/data bus, when used in an aircraft passenger cabin, eliminates the need to extend individual data and/or power cables to or between each passenger seat group.

23 Claims, 9 Drawing Sheets

SEAT POWER BUS WITH DISCRETE CONNECTION PORTS

FIELD OF THE INVENTION

The present invention relates to devices for providing power and/or data to different points within a mobile platform cabin. In particular, the present invention relates to a power/data bus having discrete connection ports.

BACKGROUND OF THE INVENTION

Mobile platforms, for example, commercial aircraft, often carry passengers or crew members. Such individuals are finding an increasing need for in-flight entertainment (IFE) and electrical power outlets to operate various electronic devices, such as laptop computers, at their seats. To provide a passenger with such features, electrical power and data must be delivered to each seat. Conventionally, power and data are delivered to passenger seats via numerous cables that, during assembly, are laid out in position on the floor of the aircraft passenger cabin. A portion of the cables are positioned beneath a covering, such as the seat track cover, and a portion that includes connectors to the seats is left exposed to connect with the yet to be installed seat groups containing each passenger seat.

During installation of the seat groups, the seat groups must be carried in over the exposed cables. Taking care to avoid the exposed cables increases both the complexity of the operation and the amount of time required to install the seats. Once the seats are installed, installers must crawl along the floor of the aircraft to manually attach each cable to each seat group. This process is cumbersome and time consuming. Further, in order to change the longitudinal position of the seat groups along the seat tracks, the seat tracks must be re-wired so that the wiring contained therein will reach the seats in their new positions. As would be expected, re-wiring an aircraft is a costly and time consuming process.

In view of the foregoing, it is desirable to provide an improved device for delivering power and/or data to seat groups in a mobile platform that eliminates the need to run individual data/power cables to each seat group.

SUMMARY OF THE INVENTION

The present invention provides for a system for conducting signals, such as electrical signals forming data signals to a variety of discrete connection ports at the seats on a mobile platform. In one preferred form the system comprises an elongated power bus, a plurality of discrete connection ports, and at least one conductive cable. The elongated power bus extends across an area where access to at least one of data and electricity is desired. The discrete connection ports are spaced apart at different locations along the power bus. The conductive cable extends through the power bus and is connected to at least one of the discrete connection ports. The conductive cable conducts at least one of electricity and data between the discrete connection ports and a data/power source. At least one of the connection ports are operable to cooperate with a connector of an external device to supply at least one of electricity and data to the external device.

In another preferred form the invention provides for an aircraft passenger cabin comprising an elongated power bus, a plurality of discrete connection ports, and at least one conductive cable extending through the power bus. The elongated power bus extends across at least a portion of the passenger cabin. The plurality of discrete connection ports are spaced apart at different locations along the power bus. At least one conductive cable extends through the power bus. The cable is connected to at least one of the discrete connection ports and is connected to a data/power source. At least one of the connection ports is operable to cooperate with a connector of a passenger seat to transmit at least one of data and electricity between the passenger seat and the data/power source.

In yet another preferred form, the invention provides for a method for forming a device for conducting at least one of data and electricity to a variety of individual locations. The method includes the following steps: forming an elongated power bus extending across an area where access to at least one of data and electricity is desired; forming a plurality of discrete connection ports spaced apart at different locations along the power bus; and forming at least one conductive cable extending through the power bus and connected to at least one of the discrete connection ports. The conductive cable conducts at least one of electricity and data between the discrete connection ports and a data/power source. At least one of the connection ports is operable to cooperate with a connector of an external device to supply at least one of electricity and data to the external device.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
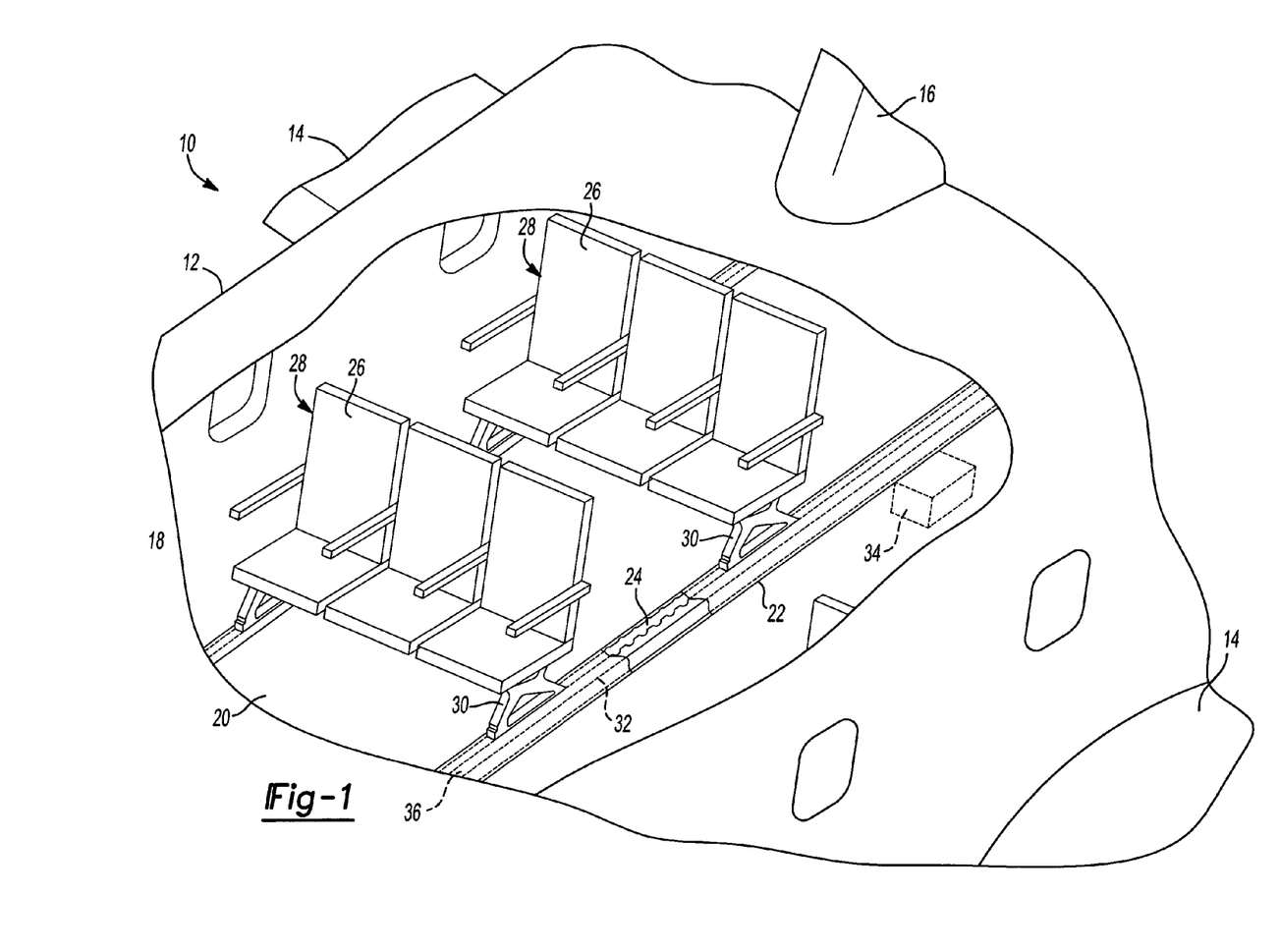
FIG. 1 is a perspective view of a portion of an aircraft passenger cabin equipped with a power bus according to a preferred embodiment of the present invention.

With initial reference to FIG. 1, a passenger aircraft equipped with a power bus system according to one preferred embodiment of the present invention is illustrated at reference numeral 10. It will be appreciated immediately, however, that the present invention can be implemented in virtually any form of mobile platform such as a ship, train, bus, motor craft, or other airborne vehicle, or even in fixed structures such as theatres, conference rooms, auditoriums, etc., or wherever there is a need to supply power and/or data signals to connection ports or components mounted on a plurality of seats.

Figure 2:
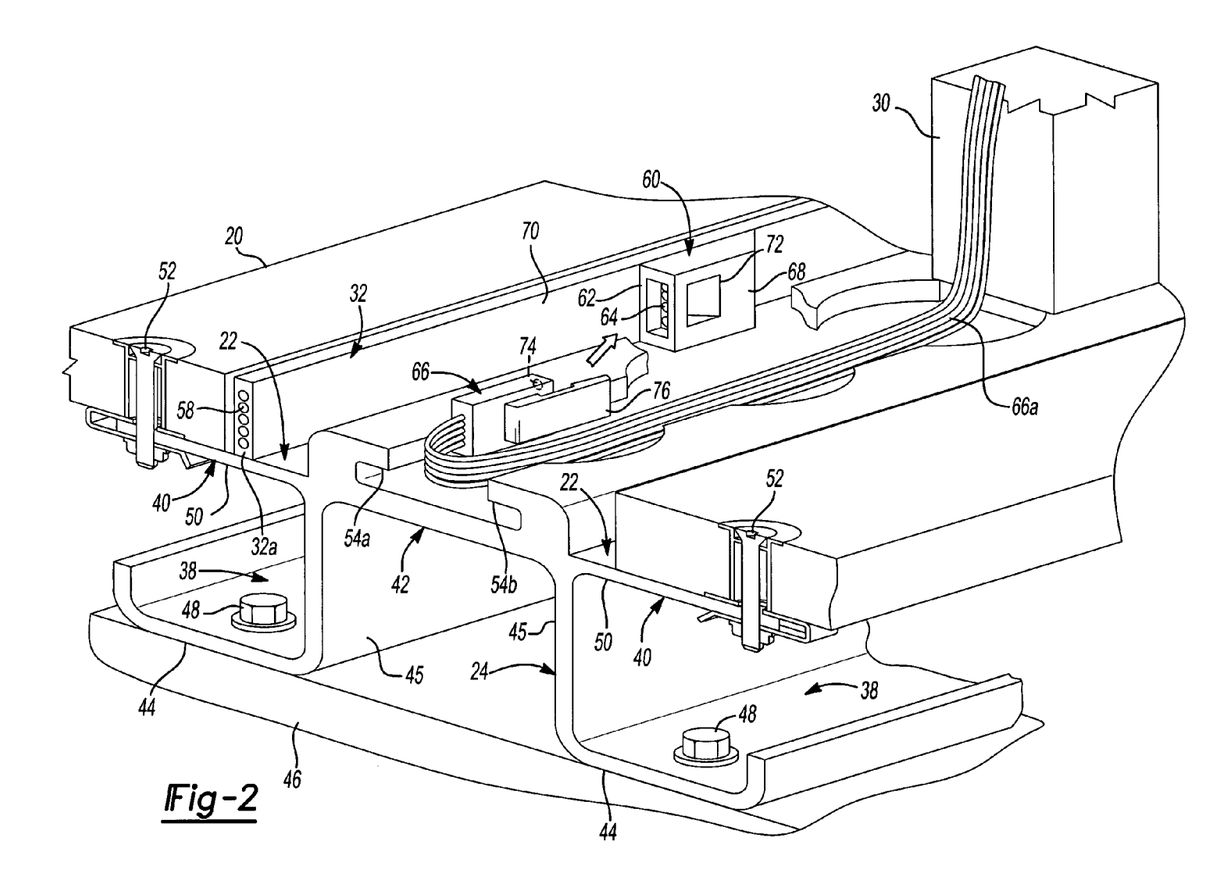
FIG. 2 is a perspective view of a seat track aperture equipped with a power bus according to an embodiment of the present invention and the surrounding environment.

With continued reference to FIG. 1 and additional reference to FIG. 2, the aircraft 10 generally includes a fuselage 12, wings 14, and a tail fin 16. The fuselage 12 includes a passenger cabin 18 having a floor 20. A plurality of parallel seat track channels 22 are recessed in the floor 20 and extend longitudinally along a major portion of the floor. Within one or more of the seat track channels 22 is a seat track 24. Typically, two or more passenger seats 26 are grouped together in a row to form a seat group 28. The seat group 28 includes spaced apart legs 30 that engage the seat track 24 to secure the seat group 28 securely to the floor 20 of the passenger cabin 18.

A power bus 32 is positioned within the seat track channel 22 and is mounted to an inner side surface of the floor 20. The power bus 32 connects to a data/power source 34 onboard the aircraft 10 and extends within the seat track channel 22 along a major longitudinal portion of the passenger cabin 18. A seat track cover 36 covers the seat track channel 22, the power bus 32, and the seat track 24.

Referring specifically to FIG. 2, the seat track 24 includes a base portion 38, floor support flanges 40, and a seat engagement portion 42. The base portion 38 includes a pair of extensions 44 depending from walls 45 to support the seat track 24 on a fuselage floor beam 46 located below the floor 20 and within the channel 22. A plurality of fasteners 48 secure the seat track 24 to the floor beam 46. A plurality of fasteners 52 extend through the floor 20 and engage the floor support flanges 40 to secure the seat track 24 to the floor 20 and within the channel 22. The seat engagement portion 42 includes two inwardly turned side rails 54A and 54B integrally formed with a lower wall portion 55 to form a channel 57 extending the full length of the seat track 24. The seat leg 30 is received by the side rails 54 and secured in position in the channel 57 between the side rails 54 by a suitable fastening device or method.

As illustrated in FIG. 2, the power bus 32 is positioned within the seat track channel 22 between the floor 20 and the seat engagement portion 42. The power bus 32 is secured to the floor 20 using any suitable mechanical or adhesive fastener or fastening system. However, the power bus 32 can also be positioned at any other point onboard the aircraft 10 to deliver power and/or data to various different remote locations. The power bus 32 has an insulating jacket 32a that can be made of any suitable insulative material and can be rigid or flexible. The power bus 32 can also be made to be water resistant.

The power bus 32 includes a plurality of electrically conductive wires 58 that extend through the length of the power bus 32. The wires 58 are in cooperation with the power/data source 34 to receive/transmit power and/or data signals between the data/power source 34 and the power bus 32. The power bus 32 further includes a plurality of discrete connection ports 60 that are spaced apart along the length of the power bus 32. Each connection port 60 includes a receptacle 62 having metallic contacts 64 that are in electrical contact with the wires 58. Therefore, data and/or power can be received from and/or transmitted to the data/power source 34 through a connection with any one or more of the connection ports 60.

As illustrated in FIG. 2, data and/or power is transmitted between the data/power source 34 and the passenger seat group 28 through a connection between the connection port 60 and a connector 66. The connector 66 has an electrically conductive cable assembly 66a that is routed to a port (not shown) associated with the seat group 28. The connector 66 thus enables electrical signals (data and/or power) to be communicated to one or more seats 26 of the seat group 28.

Figure 3:
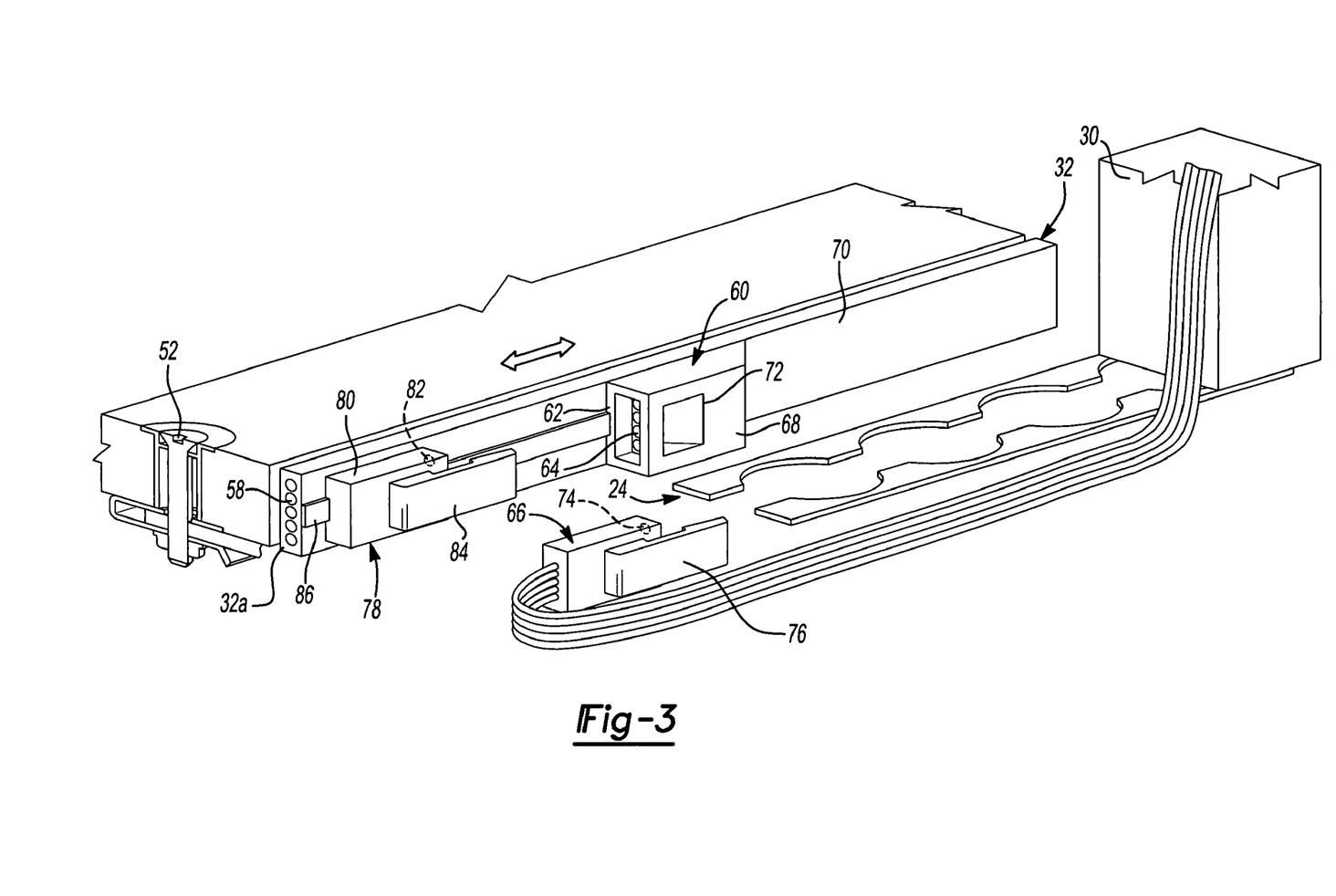
FIG. 3 is a perspective view of the power bus of FIG. 2 equipped with a protective cap.

As illustrated in FIGS. 2 and 3, the connection port 60 includes a housing 68. The housing 68 protrudes from the jacket 32a of the power bus 32. The receptacle 62 is seated within the housing 68. The housing 68 further includes a locking recess 72 located on an exterior of the housing.

The connector 66 includes contacts 74 that are configured to cooperate with the contacts 64 of the receptacle 62. The connector 66 further includes a flexible retainer arm 76. Cooperation between the connector 66 and the connection port 60 is made by engaging the contacts 64 with the contacts 74. This connection is maintained, in part, by cooperation between the retainer arm 76 and the locking recess 72 where the retainer arm 76 is engaged in the recess 72.

As illustrated in FIG. 3, to protect the connection port 60, and the receptacle 62 in particular, one or more of the connection ports 60 is optionally provided with a protective cap 78. The protective cap 78 generally includes a body 80, a plug 82, and a flexible locking arm 84. When the cap 78 is in use, the plug 82 forms a watertight connection with the receptacle 62 to protect the receptacle 62 from foreign materials, such as water. Contact between the locking arm 84 and the locking recess 72 helps maintain cooperation between the cap 78 and the connection port 60.

The cap 78 can be secured to the bus 32 to permit storage of the cap 78 proximate the power bus 32 when the cap 78 is not in use. The cap 78 can be secured to the bus 32 in any number of suitable ways. For example, the cap 78 can be secured to the jacket 32a of the bus 32 using a string or lanyard (not shown). Further, the cap 78 can be retained on the jacket 32a of the bus 32 by a short length of track 86 integrally formed on the jacket 32a. In this implementation, the cap 78 is slidably received on the track 86 to permit the cap 78 to engage the connection port 60 when it is desirable to protect the receptacle 62. When the cap 78 is not in use it can be slid along the bus track 86 to disengage the connection port 60 and permit access to the port 60 while still being secured to the bus 32 for easy storage.

Figure 4:
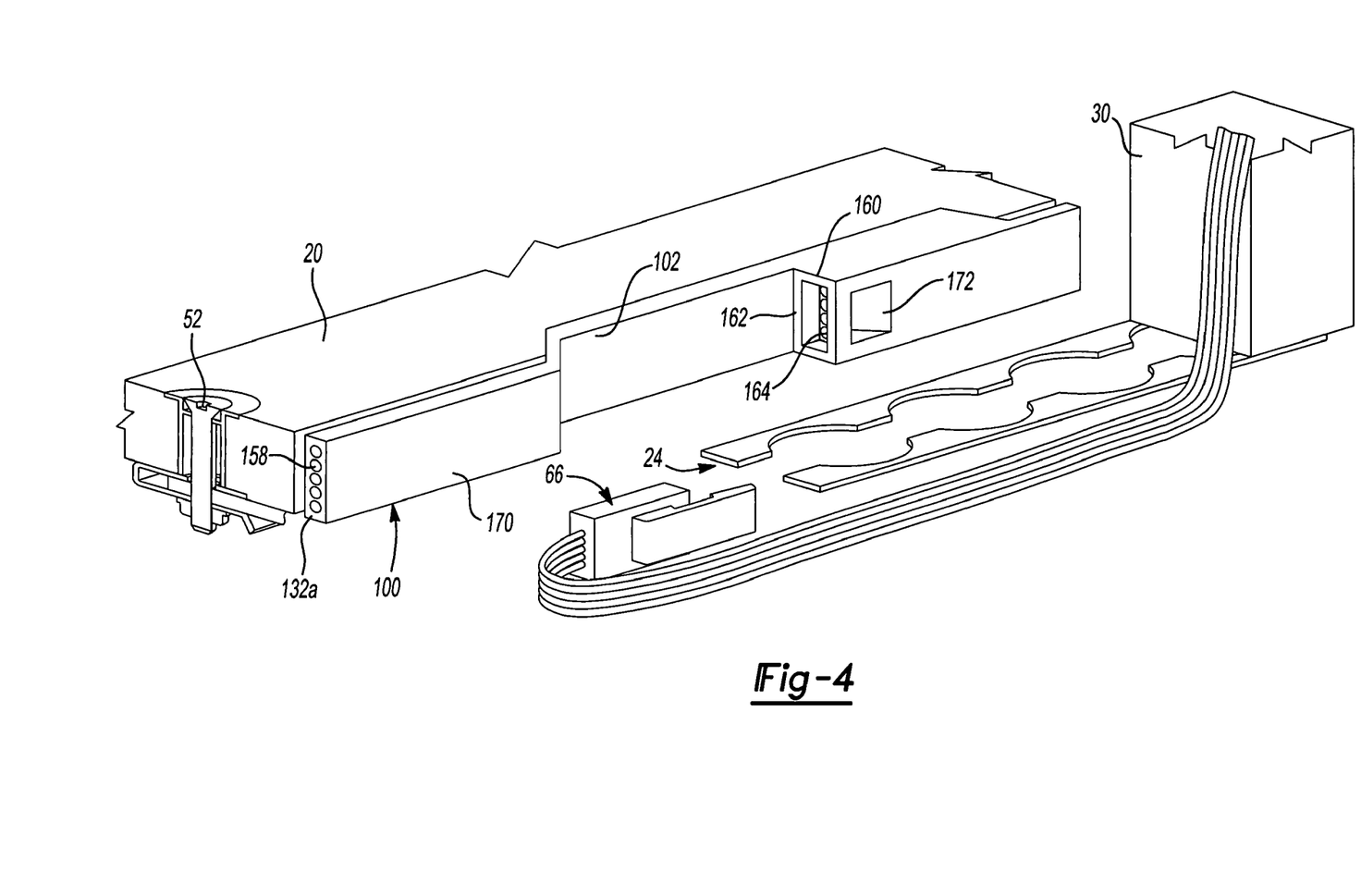
FIG. 4 is a perspective view of a power bus according to an additional embodiment of the present invention.

With reference to FIG. 4, a power bus according to an additional embodiment of the present invention is indicated by reference numeral 100. The power bus 100 is substantially similar to power bus 32. Therefore, reference numbers increased by 100 over corresponding numerals used to denote portions of power bus 32, are used to designate the like components of the power bus 100. Unlike the power bus 32, the power bus 100 includes an indentation 102 that is recessed within a jacket 132a of the bus 100. A connection port 160 is integrated with the jacket 132a of the bus 100 and a receptacle 162 is positioned within the indentation 102.

The connection port 160 does not protrude from the jacket 132a, as connection port 60 protrudes from the bus 32 of FIGS. 2 and 3.

Figure 5A:
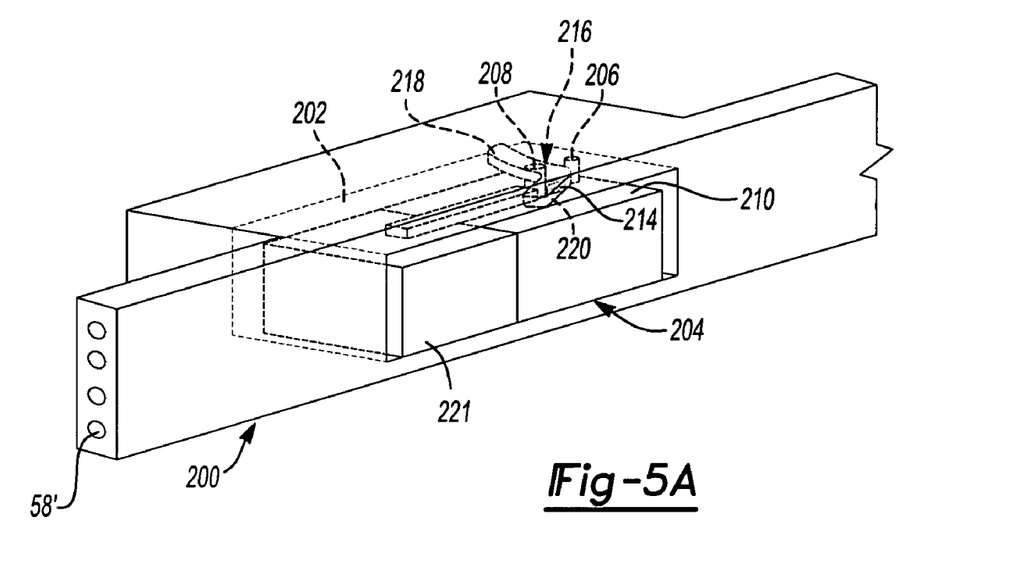
FIG. 5A is a perspective view of a power bus according to still another embodiment of the present invention having a connection port in a first position.

With reference to FIG. 5A, a power bus according to an additional embodiment of the present invention is illustrated at reference numeral 200. The power bus 200 is substantially similar to the power bus 32 and the power bus 100 and therefore, the general descriptions of the power buses 32 and 100 also applies to the power bus 200. Like the power bus 100, the power bus 200 includes an indentation, designated by reference numeral 202 in FIG. 5A. A connection port 204, which permits communication with the data/power source 34 in a manner similar to the connection port 60, is pivotally mounted within the indentation 202 on a pivot pin 206. Reference number 58' designates the wires extending through the power bus 200, which are described in detail above.

Figure 5B:
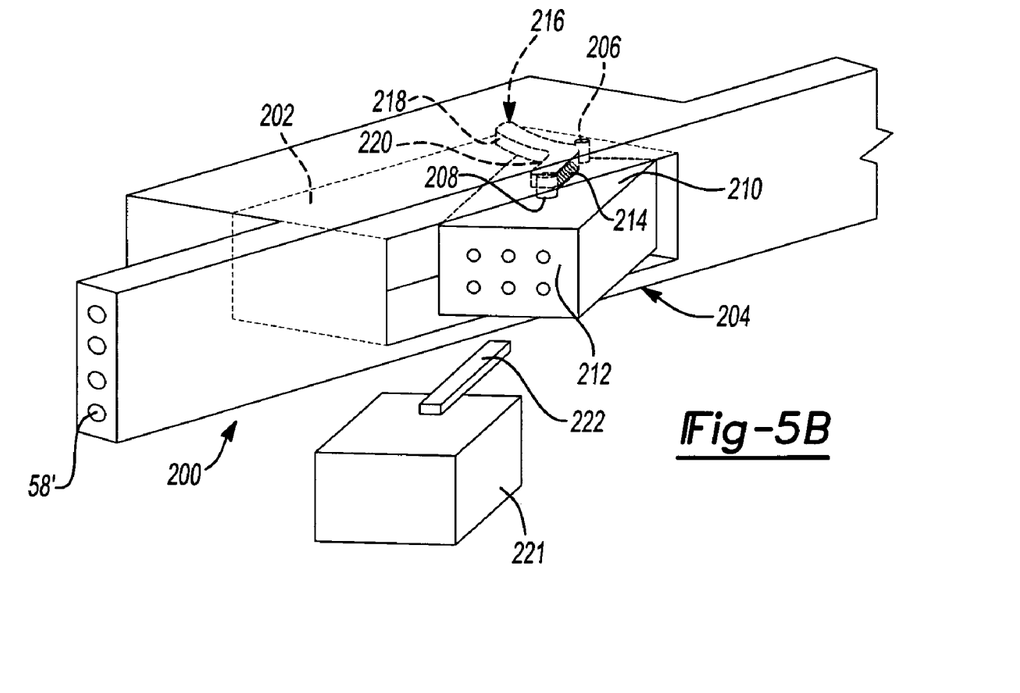
FIG. 5B is a perspective view of the power bus of FIG. 5A with the connection portion in a second position.

The connection port 204 is rotatable between a first position (FIG. 5A) and a second position (FIG. 5B). In the first position, the port 204 is fully seated within the indentation 202. In the second position, the port 204 extends partially outwardly from the indentation 202.

The port 204 further includes a locking pin 208 that extends from an upper surface 210 of the connection port 204. The locking pin 208 is slidably movable across the upper surface 210 in a direction both toward an outlet 212 of the port 204 and away from the outlet 212. A spring 214, or other biasing device, biases the locking pin 208 toward the outlet 212.

The locking pin 208 cooperates with a track 216 that is formed within the indentation 202. The track 216 includes a first portion 218 that is attached to the indentation 202 and a second portion 220 that extends from the first portion 218 at an angle of at least 90° toward the outlet 212. The first portion 218 is slightly curved to accommodate the arc of movement of the locking pin 208 during rotation of the connection port 204 between the two positions of FIGS. 5A and 5B. When the port 204 is in the first position (FIG. 5A), the locking pin 208 is seated within the first portion 218 at the furthest point from the second portion 220. When the port 204 is moved from the first position to the second position (FIG. 5B), the locking pin 208 passes through the first portion 218 and into the second portion 220 and acts as a stop to limit outward pivoting movement of the port 204. Because the second portion 220 extends from the first portion 218 at an angle of at least 90°, when the locking pin 208 is in the second portion 220 it remains in the second portion 220 to lock the port 204 into the second position B until the pin 208 is moved back to the first portion 218. Only after the locking pin 208 is moved inward and away from the outlet 212, such that it can re-enter the first portion 218, can the port 204 be returned to the first position (FIG. 5A).

To protect the outlet 212 when it is not in use, a cover 221 can be placed over the connection port 204 to provide a waterproof seal over the outlet 212. The cover 221 includes a release rod 222 that protrudes from the cover 221. When the cover 221 is in place over the connection port 204, the release rod 222 engages the locking pin 208 and moves the pin 208 inward from the second portion 220 of the track 216 to the first portion 218 to allow the locking pin 208 to rotate within the indentation 202 to the first position. The locking pin 208 prevents the port 204 from rotating into the first position without the cover 221 being in place over the outlet 212. Conversely, when the port 204 is moved from its retracted position to its extended position, removal of the cover 221 from the port 204 allows the spring 214 to move the locking pin to the second portion 220 to lock the cover 221 in its second position.

Figure 6A:
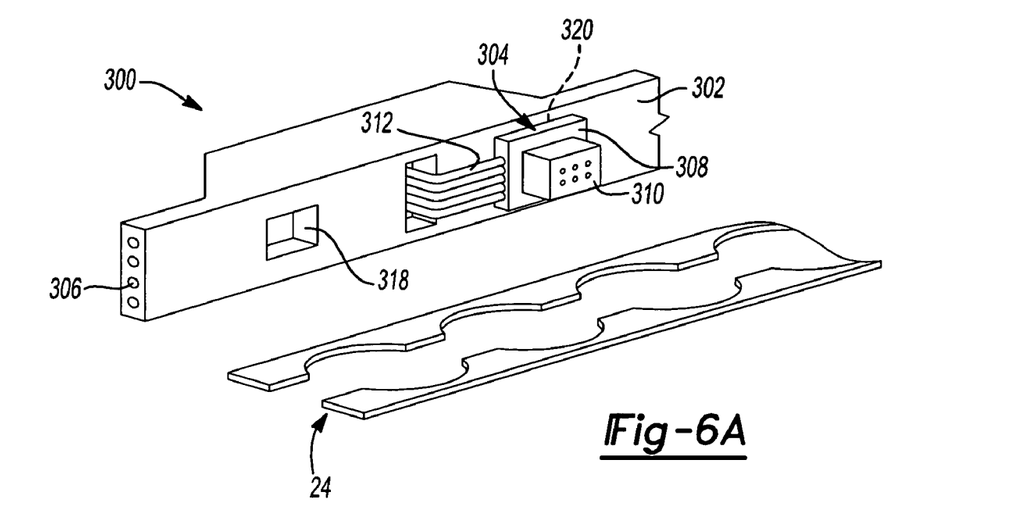
FIG. 6A is a perspective view of a power bus according to another embodiment of the present invention, the power bus having a connection port positioned in a operable position.
Figure 6B:
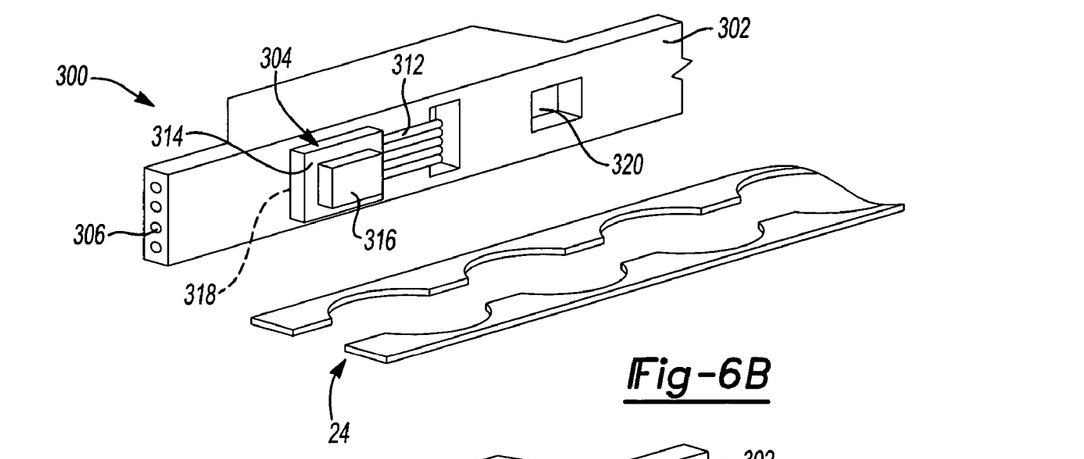
FIG. 6B is a perspective view of the power bus of FIG. 6A with the connection port positioned in a storage position.
Figure 6C:
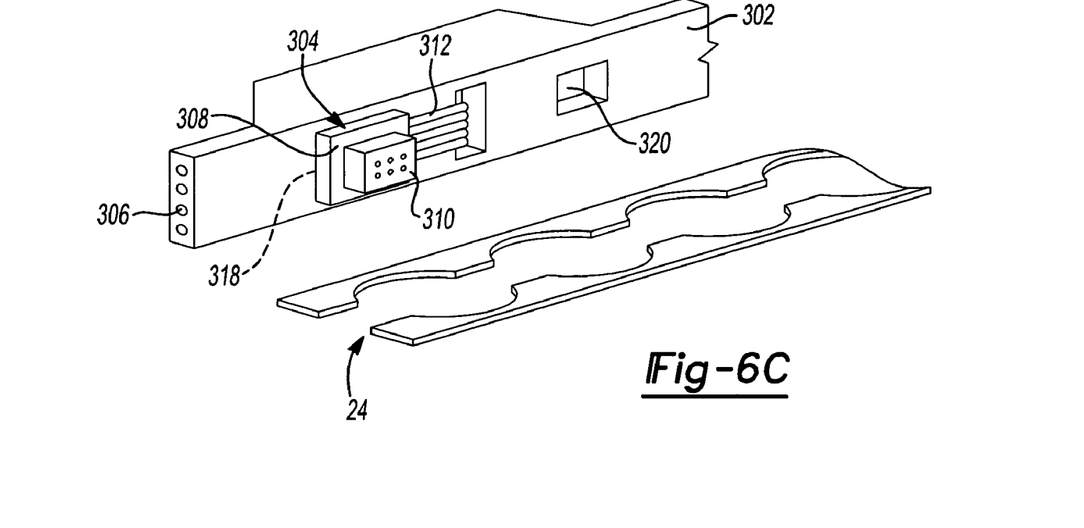
FIG. 6C is a perspective view of the power bus of FIG. 6A with the connection port mounted in a stowage pocket such that an outlet of the connection port is exposed.

With reference to FIGS. 6A–6C, a power bus according to an additional embodiment of the present invention is illustrated at reference numeral 300. The power bus 300 is similar to the power bus 32. Like the power bus 32, the bus 300 includes an elongated body 302 and at least one connection port 304. A plurality of wires 306, which are similar to the wires 58, extend through the body 302 and provide communication between each connection port 304 and the data/power source 34.

With reference to FIG. 6A, each of the connection ports 304 include a first surface 308 having a receptacle 310. Communication between the outlet 310 and the wires 306 is provided by a flexible cable 312, which also secures the port 304 to the power bus 300. With reference to FIG. 6B, each of the ports 304 further include a second surface 314, which is opposite the first surface 308. The second surface 314 includes a raised mounting knob 316. Each of the connection ports 304 are mounted at predetermined locations on the body 302 of the bus 300 by one of the flexible cables 312.

A stowage pocket 318 is located on the body 302 of the power bus 300 proximate to each of the connection ports 304. The stowage pocket 318 is recessed within the body 302 and is sized to receive the receptacle 310 when the connection port 304 is in a storage position, as illustrated in FIG. 6B. At least one of the stowage pocket 318 and the connection port 304 include a seal (not shown) to provide a water-tight connection between the stowage pocket 318 and the connection port 304 when the port 304 is in the storage position.

A support pocket 320 is also located on the body 302 of the power bus 300 proximate to each of the connection ports 304 on a side of the connection ports 304 opposite to the side where the stowage pocket 318 is located. The support pocket 320 is recessed within the body 302 and is sized to receive the mounting knob 316 when the connection port 304 is in a first operable position, illustrated in FIG. 6A. When the stowage pocket 318 and/or the support pocket 320 are not in use they can be sealed with any suitable plug or cap (not shown).

When the connection port 304 is not in use, the connection port 304 is moved to the storage position of FIG. 6B where the outlet 310 is seated within the stowage pocket 318. When access to the outlet 310 of the connection port 304 is desired, the outlet 310 is removed from within the stowage pocket 318. The connection port 304 is then rotated and the raised mounting knob 316 is inserted within the support pocket 320 to support the connection port 304 in the first operable position illustrated in FIG. 6A where the receptacle 310 is freely accessible. A seal (not shown) may be positioned on one or both of the mounting knob 316 and the support pocket 320 to help secure the mounting knob 316 within the support packet 320.

FIG. 6C illustrates a second operable position of the port 304. As illustrated in FIG. 6C, when the port 304 is in the storage position of FIG. 6B, access to the port 304 can also be provided by rotating the port 304 such that the mounting knob 316 is received by the stowage pocket 318. A seal (not shown) positioned on the mounting knob 316 and/or the stowage pocket 318 helps to secure the mounting knob 316 within the stowage pocket 318. The support pocket 320 is not needed when the port 304 is mounted in the second operable position of FIG. 6C and in such cases the stowage pocket 318 can be sealed with a cap or cover (not shown).

Figure 7:
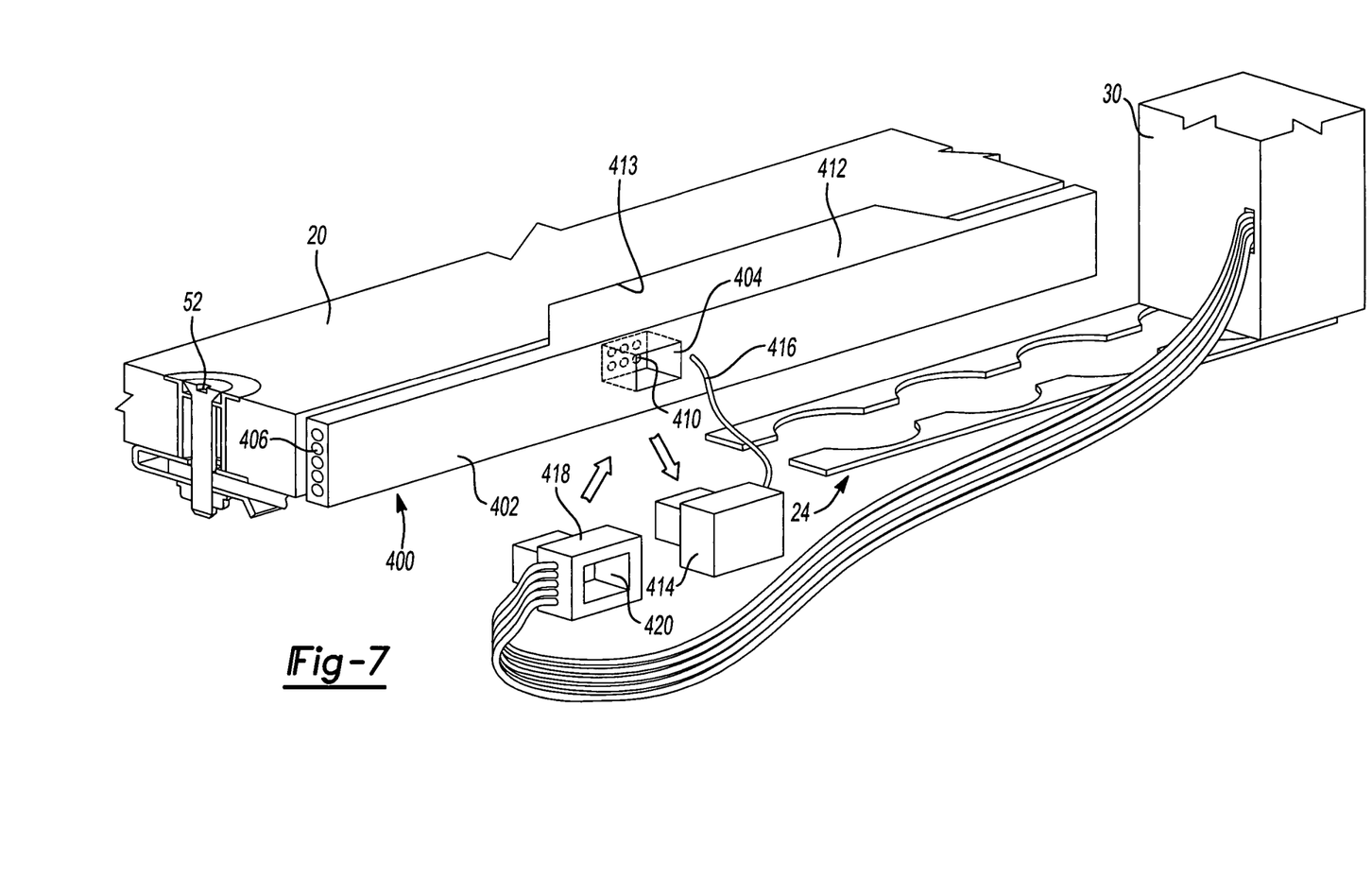
FIG. 7 is a perspective view of a power bus according to yet another embodiment of the present invention.

With reference to FIG. 7, a power bus according to an additional embodiment of the present invention is illustrated at reference numeral 400. The power bus 400 is similar to the power bus 32. Like the power bus 32, the bus 400 includes an elongated body 402 and at least one connection port 404. A plurality of wires 406, which are similar to the wires 58 of the power bus 32, extend through the body 402 and provide communication between each connection port 404 and the data/power source 34. Each of the connection ports 404 include a receptacle 410 that provides communication with the wires 406.

The connection port 404 of the power bus 400 is recessed within the body 402 and does not protrude from the body 402. To accommodate the connection port 404 within the body 402, the connection port 404 includes an extended portion 412 behind each connection port 404 that extends within a recessed area 413 of the floor 20 and away from the seat track 24.

A protective cap 414 sized to mate with the connection port 404 is provided to seal the connection port 404 when the connection port 404 is not in use. The protective cap 414 can optionally be secured to the body 402 by way of, for example, a lanyard 416 to prevent the protective cap 414 from being misplaced when it is not in use. A connector 418 is provided for coupling to the port 404 to provide communication with the electronics of the seat group 28. The connector 418 is shaped to cooperate with the connection port 404 and includes a recess 420 that is sized to receive the cap 414 when the cap 414 is not in use.

Figure 8A:
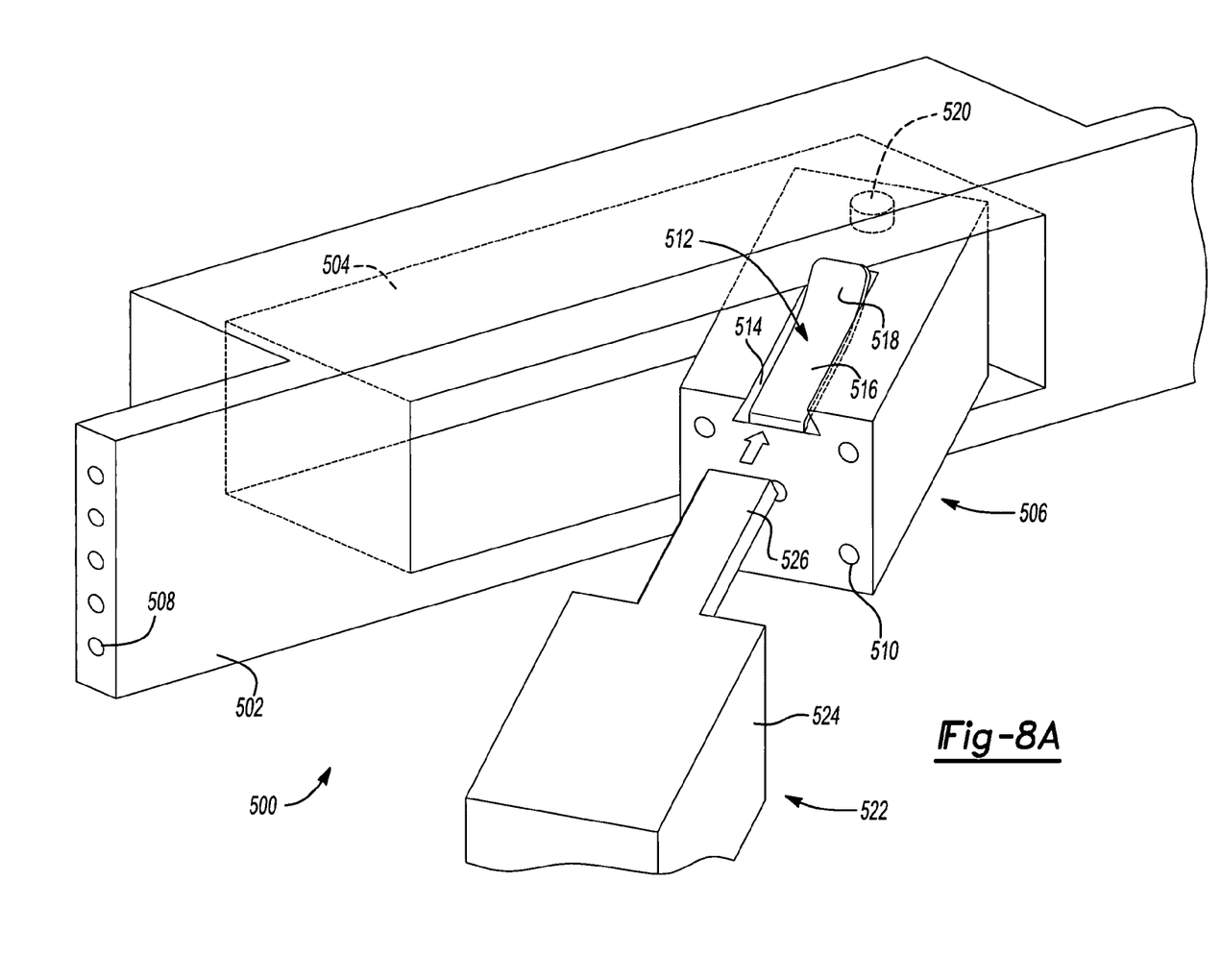
FIG. 8A is a perspective view of a power bus according to an additional embodiment of the present invention having a connection port in a first position.
Figure 8B:
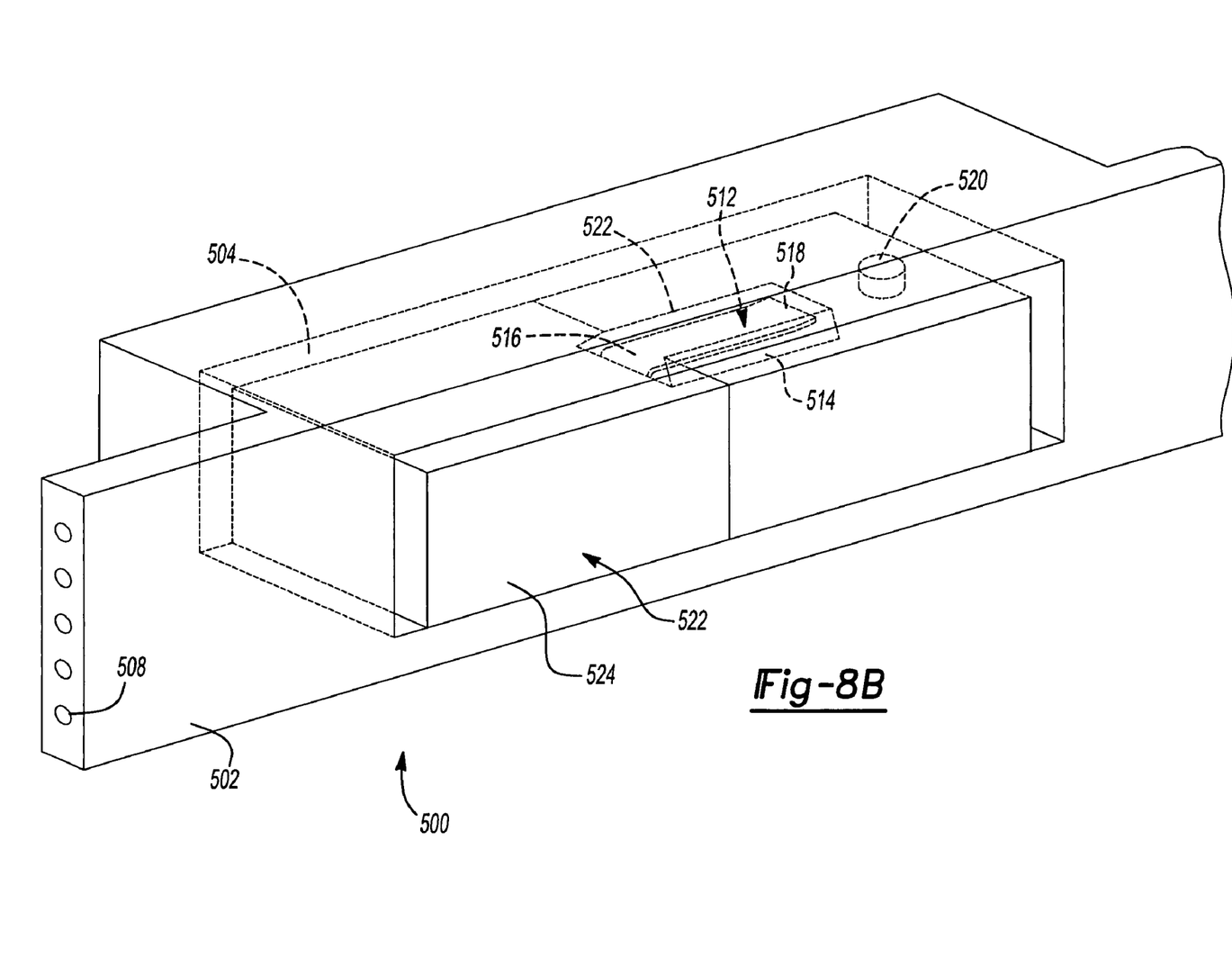
FIG. 8B is a perspective view of the power bus of FIG. 8A with the connection portion in a second position.

With reference to FIGS. 8A and 8B, a power bus according to an additional embodiment of the present invention is illustrated at reference numeral 500. The power bus 500 is substantially similar to the power buses described above, such as power bus 200. Like the power bus 200, the power bus 500 includes an elongated body 502 with at least one recessed portion 504. Each recessed portion 504 houses a connection port 506. A plurality of wires 508 extend through the body 502 and provide communication between each connection port 506 and the data/power source 34.

With reference to FIG. 8A, the connection port 506 generally includes a plurality of contacts 510 and a flexible tab 512 seated within a cavity 514. The contacts 510 provide communication between the wires 508 and an external connector, such as the connector 66 (FIG. 2).

The flexible tab 512 includes a main body 516 and a raised portion 518. The main body 516 is seated within the cavity 514. The tab 512 is biased upward such that the raised portion 518 extends above and outside of the cavity 514. The raised portion 518 may be shaped such that it gradually curves upward out of the cavity 514. The cavity 514 has a generally dove-tail shape in cross section. The tab 512 may be integrated with or formed with the connection port 506 or the tab 512 may be a separate component that is secured within the cavity 514.

The connection port 506 is pivotally mounted within the recessed portion of the power bus 500 on a pivot pin 520. The connection port 506 can pivot between an open position (FIG. A) where the connection port 506 extends out from within the recessed portion 504 and a storage position (FIG. B) where the connection port 506 is completely seated within the recess portion 504. When the connection port 506 is in the open position the raised portion 518 of the tab 512 contacts an outer surface of the body 502 to restrict movement of the connection port 506 to within the recessed portion 504 and the storage position of FIG. 8B.

To move the connection port 506 from the open position (FIG. 8A) to the closed position (FIG. 8B), and to remove the interference between the tab 512 and the body 502, a cover 522 may be inserted over the contacts 510. The cover 522 includes a main body 524 and a finger 526. The rod 526 extends from the main body 524 and has a shape that is complimentary to the dovetail shape of the cavity 514. The cover 522 engages the connection port 506 such that the body 524 covers the contacts 510 and the rod 526 is seated within the cavity 514 to depress the tab 512 downward such that the raised portion 518 does not extend out from within the cavity 514, thus eliminating the interference between the raised portion 518 and the body 502. Therefore, with the cover 522 in place over the connection port 506 the connection port 506 can be moved from the open position of FIG. 5A to the closed position of FIG. 5B. Similarly, when the connection port 506 is moved from the closed position to the open position and the cover 522 is removed, the raised portion 518 moves upward from within the tab 512 to interfere with the body 502 and to inhibit movement of the connection port 506 back to within the recessed portion 504. Therefore, this embodiment insures that the cover 522 is in position to protect the contacts 510 when the connection port 506 is moved to the storage position.

The power buses 32, 100, 200, 300, 400 and 500 can include a variety of different features and can be provided in a variety of different configurations in addition to those described above. For example, while each of the busses 32, 100, 200, 300, 400 and 500 are described as being located along the floor 20 near the seat track 24, the busses 32, 100, 200, 300, 400 and 500 can be positioned at any point in the aircraft, as well as in any other type of mobile or stationary platform. Further, the wires 58, and any of the other wires or cables described above, can either be made of a conductive metal, such as copper, be fiber optic cables, or be any other type of cable that is capable of conducting power and/or data signals.

Therefore, the present invention provides for a power bus having numerous individual connection ports to provide data and/or power connections between a plurality of spaced apart seats mounted to a common support track and a centralized data/power source. The power bus can be positioned in a variety of different locations, such as along an aircraft passenger cabin floor in a seat track channel between the floor and the seat track.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An apparatus for enabling communication of signals with communication ports associated with a plurality of spaced apart seats supported along a common support track, the apparatus comprising:

a signal bus adapted to be disposed at least approximately parallel to the support track without interfering with support structure of said seats being coupled to said support track;

said signal bus including an elongated jacket extending along at least a major portion of a length of said support track;

said jacket including:

a conductor housed therein for communicating said signals therethrough; and a plurality of embedded coupling ports at spaced apart locations along said jacket corresponding to approximate locations of said seats, each of said spaced apart coupling ports being in communication with said conductor and adapted to engage with connectors of external cables associated with said communication ports of said seats.

2. The apparatus of claim 1, wherein at least one of said coupling ports comprises a latching member for cooperating with a latching portion on at least one of said connectors of said cables to secure said one connector to said jacket.

3. The device of claim 1, wherein said coupling ports extend from said jacket.

4. The device of claim 1, further comprising a cover operable to mate with said coupling port when said coupling port is not in use.

5. The device of claim 4, wherein said cover is slidably secured to said jacket.

6. The device of claim 1, wherein said bus further comprises a plurality of indentations within said jacket;
wherein said coupling ports each further comprise an outlet; and
wherein said outlets are located within said indentations.

7. The device of claim 1, wherein said coupling port is movable between a first position in which said coupling port is recessed within said jacket and a second position in which said coupling port extends from within said jacket.

8. The device of claim 7, wherein said coupling port further comprises a pin that cooperates with a track;
wherein said track has a first portion and a second portion that extends from said first portion at an angle;
wherein said coupling port is operable to move between said first position and said second position when said pin is in said first portion; and
wherein said coupling port is locked in said second position when said pin is in said second portion.

9. The device of claim 8, further comprising a cover having a release rod;
wherein when said cover mates with said coupling port said release rod contacts said pin to move said pin to said first portion of said track to permit movement of said coupling port to said first position.

10. The device of claim 1, wherein said coupling port is secured to said bus by a flexible cord to permit movement of said coupling port between a storage position and an operable position; and
wherein said coupling port further comprises an outlet on a first side of said coupling port and a mounting knob on a second side of said coupling port opposite said first side.

11. The device of claim 10, wherein said bus further comprises a support pocket and a stowage pocket;
wherein said outlet of said coupling port is seated within said stowage pocket when said coupling port is in said storage position; and
wherein said mounting knob of said coupling port is seated within said support pocket when said coupling port is in said operable position.

12. The device of claim 10, wherein said bus further comprises a stowage pocket; and
wherein said mounting knob is seated within said stowage pocket when said coupling port is in said operable position; and
wherein said outlet is seated within said stowage pocket when said coupling port is in said storage position.

13. The device of claim 1, wherein said coupling port is recessed within said bus; and
wherein said connector includes a recess to receive and store a protective cap.

14. The device of claim 7, wherein said coupling port further comprises a cavity and a movable tab seated within said cavity, said tab movable between a recessed position where said tab is recessed within said cavity and an extended position where said tab extends from within said cavity to contact said jacket;
wherein said tab is positioned in said recessed position when said coupling port is in said first position and said tab is positioned in said extended position when said coupling port is in said second position.

15. The device of claim 14, wherein said tab is moved from said extended position to said recessed position through cooperation between a cover and said tab.

16. The device of claim 15, wherein a rod portion of said cover contracts said tab; and
wherein both said rod portion and said recessed portion have a dove-tail shape.

17. An aircraft comprising:
an elongated electrical signal bus extending across at least a portion of a passenger cabin thereof;
a plurality of discrete connection ports spaced apart at different locations along said electrical signal bus; and
a conductor extending through said electrical signal bus, said conductor connected to a plurality of said spaced apart discrete connection ports and connected to an electrical signal source;
at least one of said connection ports adapted to be coupled to a connector of a passenger seat to transmit electrical signals between said passenger seat and said electrical signal source.

18. The aircraft of claim 17, wherein said connection ports extend from a body of said electrical signal bus.

19. The aircraft of claim 17, further comprising a plug operable to mate with said connection port when said connection port is not in use.

20. The aircraft of claim 17, wherein said electrical signal bus further comprises a plurality of indentations within a body of said electrical signal bus;
wherein said connection ports each further comprise an outlet; and
wherein said outlets are located within said indentations.

21. The aircraft of claim 17, wherein said connection port is movable between a first position in which said connection port is recessed within said electrical signal bus and a second position in which said connection port extends from within said electrical signal bus.

22. The aircraft of claim 17, wherein said connection port is secured to said electrical signal bus by a flexible cord to permit movement of said connection port between a storage position and an operable position; and
wherein said connection port further comprises an outlet on a first side of said connection port and a mounting knob on a second side of said connection port opposite said first side.

23. A method for conducting at least one of data and power signals to a plurality of individual locations comprising:
forming an elongated bus extending across an area where access to at least one of data and power is desired;
forming a plurality of discrete connection ports spaced apart at different locations along said bus; and locating a conductor in said bus and connecting said discrete connection ports to said conductor;

using said conductor to conduct at least one of power and data signals between said discrete connection ports and a signal source; and using at least one of said connection ports to supply at least one of power and data signals to a connector of an external device.

* * * * *